United States Patent [19]

Levassor

[11] 4,343,505
[45] Aug. 10, 1982

[54] EDDY-ELIMINATING ARRANGEMENT FOR A TOWING VEHICLE

[76] Inventor: Jean Levassor, 11 Villa Molitor, 75016 Paris, France

[21] Appl. No.: 195,216

[22] Filed: Oct. 7, 1980

[30] Foreign Application Priority Data

Oct. 8, 1979 [FR] France ................. 79 24961

[51] Int. Cl.³ ............................................. B62D 35/00
[52] U.S. Cl. .................................................. 296/1 S
[58] Field of Search ................... 296/1 S; 105/8 R; 280/403

[56] References Cited

U.S. PATENT DOCUMENTS 2,793,597  5/1957  Walters ........................... 105/8 R
3,425,740  2/1969  De Vaughn ....................... 296/1 S
3,711,146  1/1973  Madzsar .......................... 296/1 S
3,834,752  9/1974  Cook et al. ....................... 296/1 S Primary Examiner—Robert R. Song
Attorney, Agent, or Firm—Pollock, Vande Sande & Priddy

[57] ABSTRACT

The invention relates to an eddy-eliminating arrangement for a towing vehicle.

A non-rigid sheet is secured in leaktight manner to at least the sides and top of a transverse section of the towing vehicle, this sheet extending rearwardly and embracing the front part of the towed vehicle and being secured to the latter by springs which keep the sheet stretched in all the relative positions of the two vehicles. The invention is particularly applicable to vehicles which tow caravans.

4 Claims, 1 Drawing Figure

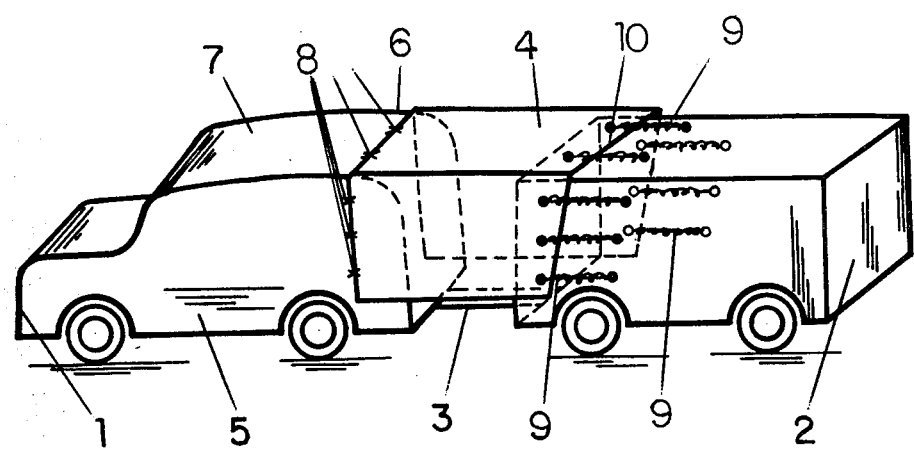

EDDY-ELIMINATING ARRANGEMENT FOR A TOWING VEHICLE

This invention relates to towing vehicles, particularly but not exclusively road vehicles which tow a caravan or other trailer, for example a camping trailer or a lorry trailer.

It is known that the space between a towing vehicle and its trailer is a location or center of eddies which lead to additional fuel consumption and impair the good qualities of the trailer.

A known means for reducing eddy formation in this region comprises a deflector fixed to the top of the towing vehicle. This deflector provides only a partial solution to the eddy problem however, and its effectiveness decreases substantially when with one another the vehicle and trailer are not in alignment.

The present invention seeks to provide an arrangement whose effectiveness in reducing eddy formation is both greater and more permanent.

According to the invention, an arrangement for preventing eddy formation between a towing vehicle and a towed vehicle, particularly road vehicles, comprises a non-rigid sheet which overlies and is fixed in a leaktight manner to the sides and the top of a transverse section of the towing vehicle and which extends rearwardly and embraces the front part of the towed vehicle, the said sheet being secured to the towed vehicle by spring means which keep the sheet stretched in all relative positions of the two vehicles.

The single FIGURE of the attached drawing illustrates an example of an arrangement in accordance with the invention in diagrammatic perspective side view.

The FIGURE shows a towing vehicle 1, which tows a trailer 2 by means of a coupling indicated diagrammatically by 3.

A non-rigid sheet or web 4 is held passed against the two sides 5,6 and the top 7 of the towing vehicle. The sheet 4 may be secured to the towing vehicle by any means which are per se known, preferably means which ensure good, leaktight, positioning of the sheet against the vehicle wall. Suitably for example, use is made of a profiled member fixed to the vehicle 1 along a transverse cross section, this member receiving the edge of the sheet 4 which is shaped to be interengaged therewith or is pinched or which is clamped therein.

Alternatively, point fixings are used, such as fixings 8 shown in the drawings.

The fixing means are preferably such as will enable the sheet 4 to be easily put in place and disposed as and where desired and easily removed.

Towards the rear, the sheet 4 extends over the front of the trailer 2, where it floats on the latter but is kept stretched by a number of tension springs 9 which connect the rear edge 10 of the sheet to the sides and the roof of the trailer.

If desired, the sheet 4 may be made in the form of a sheath which completely surrounds the rear part of the towing vehicle 1 and the front part of the trailer 2, including the undersides.

The front edge of the flexible sheet 4 is disposed at any desired position on the rear half of the towing vehicle 1, the position being so selected, according to the nature and shape of the vehicle, that the sheet does not cause difficulty or inconvenience and bears easily against the sides of the vehicle. For example, the transverse cross section of the towing vehicle 1 at which the front edge of sheet 4 is located is suitably in the region of the rear axle or rearward of this axle of vehicle 1.

The sheet 4 may be in a one piece flexible sheet or composed of a plurality of separate panels. For example, a simple arrangement in accordance with the invention is obtained by using, instead of a single sheet or sheath, non-rigid panels which are separately secured, in the same manner, one to the tops of the two vehicles 1 and 2, one to each of the sides of the vehicles and, if possible, one to the said two bottoms of the vehicles. Alternatively, use may be made of rigid panels which are so articulated to one another that the assembly of panels is non-rigid.

The sheet may be made of any suitable material, namely plastics, metal, fabric or like material.

The springs 9 may, for example, be elongated springs of the Sandow or elastic-cord type.

What is claimed is:

1. An arrangement for preventing eddy formation between a towing vehicle and a towed vehicle comprising a nonrigid sheet which overlies the opposing sides and the top of a transverse section of the towing vehicle and which extends rearwardly therefrom and overlies the top and opposing sides of the towed vehicle adjacent the front part of the towed vehicle, the said sheet being releasably attached to and bearing against the opposing sides and the top of the towing vehicle, and said sheet being releasably secured to the towed vehicle by spring means which are disposed between said sheet and the top and opposing sides of the towed vehicle and which keep the sheet stretched against the opposing sides and the top of the said towed vehicle in all relative positions of the two vehicles.

2. An arrangement according to claim 1, wherein the sheet is a one-piece flexible sheet.

3. The arrangement of claim 1 wherein said spring means comprises a plurality of spring members which are disposed in spaced relation to one another and extend respectively between the rear edge of said sheet and points on the towed vehicle rearward of said rear edge.

4. The arrangement of claim 3 wherein said spring members comprise elonated elastic cords.

* * * * *